United States Patent
Steinberg et al.

(10) Patent No.: US 7,551,754 B2
(45) Date of Patent: Jun. 23, 2009

(54) METHOD AND APPARATUS FOR SELECTIVE REJECTION OF DIGITAL IMAGES

(75) Inventors: Eran Steinberg, San Francisco, CA (US); Peter Corcoran, Claregalway (IE); Petronel Bigioi, Galway (IE)

(73) Assignee: FotoNation Vision Limited, Galway (IE)

( * ) Notice: Subject to any disclaimer, the term of this patent is extended or adjusted under 35 U.S.C. 154(b) by 371 days.

(21) Appl. No.: 11/460,227

(22) Filed: Jul. 26, 2006

(65) Prior Publication Data

US 2007/0201726 A1    Aug. 30, 2007

Related U.S. Application Data

(60) Provisional application No. 60/776,338, filed on Feb. 24, 2006.

(51) Int. Cl.
*G06K 9/00*    (2006.01)

(52) U.S. Cl. .................. 382/112; 358/3.26; 348/135; 707/100

(58) Field of Classification Search .............. 382/100, 382/112, 181, 190, 192, 194, 195, 254, 255, 382/274, 275; 358/3.24, 3.26, 537; 250/559, 250/571; 348/135; 707/100, 101, 102
See application file for complete search history.

(56) References Cited

U.S. PATENT DOCUMENTS

| | | |
|---|---|---|
| 5,692,065 A | 11/1997 | Prakash et al. |
| 5,802,361 A | 9/1998 | Wang et al. |
| 5,963,656 A | 10/1999 | Bolle et al. |
| 6,072,903 A | 6/2000 | Maki et al. |
| 6,115,509 A | 9/2000 | Yeskel |
| 6,456,737 B1 | 9/2002 | Woodfill et al. |
| 7,174,033 B2 * | 2/2007 | Yukhin et al. ............. 382/115 |
| 2003/0068100 A1 * | 4/2003 | Covell et al. ............. 382/305 |
| 2003/0071908 A1 | 4/2003 | Sannoh et al. |
| 2003/0160879 A1 | 8/2003 | Robins et al. |
| 2003/0190090 A1 | 10/2003 | Beeman et al. |
| 2004/0170397 A1 | 9/2004 | Ono |
| 2004/0213482 A1 | 10/2004 | Silverbrook |
| 2004/0258304 A1 * | 12/2004 | Shiota et al. ............. 382/170 |
| 2005/0286802 A1 * | 12/2005 | Clark et al. ............. 382/286 |

(Continued)

FOREIGN PATENT DOCUMENTS

EP    1 748 378    1/2007

OTHER PUBLICATIONS

PCT Notification of Transmittal of the International Search Report and the Written Opinion of the International Searching Authority, or the Declaration, PCT Application No. PCT/US2006/030315, dated May 2, 2007.

(Continued)

*Primary Examiner*—Anand Bhatnagar
(74) *Attorney, Agent, or Firm*—Andrew V. Smith

(57) ABSTRACT

An unsatisfactory scene is disqualified as an image acquisition control for a camera. An image is acquired. One or more regions of facial or other key features are determined in the image. These regions are analyzed to determine whether they are unsatisfactorily blocked or shadowed, and if so, then the scene is disqualified as a candidate for a processed, permanent image while the feature continues to be blocked or shadowed.

33 Claims, 13 Drawing Sheets

U.S. PATENT DOCUMENTS

2008/0192129 A1* 8/2008 Walker et al. ............ 348/231.2

OTHER PUBLICATIONS

Huang, W. et al., "Eye Tracking with Statistical Leaning and Sequential Monte Carlo Sampling," IEEE. ICICS-PCM 2003, Dec. 15-18, 2003, pp. 1873-1878.

PCT Notification of Transmittal of the Intl. Search Report and Written Opinion of the Intl. Searching Authority, PCT Appln No. PCT/US2006/30173, dated Nov. 1, 2007, 12 pgs.

EP Supplementary European Search Report, EP Appln. No. 06 78 9329, dated Jan. 22, 2009, 7 pgs.

* cited by examiner

METHOD AND APPARATUS FOR SELECTIVE REJECTION OF DIGITAL IMAGES

CROSS-REFERENCE TO RELATED APPLICATIONS

This application claims priority to U.S. provisional patent application No. 60/776,338, filed Feb. 24, 2006. This application is one of a series of applications filed on the same day, including one entitled METHOD AND APPARATUS FOR SELECTIVE DISQUALIFICATON OF DIGITAL IMAGES, Ser. No. 11/460,218, and another entitled DIGITAL IMAGE ACQUISITION CONTROL AND CORRECTION METHOD AND APPARATUS, Ser. No. 11/460,225, by the same inventive entity and having common assignee. Each of these applications is hereby incorporated by reference.

FIELD OF THE INVENTION

The invention relates to digital image acquisition, and particularly to disqualifying a scene as a candidate for a processed, permanent image due to the presence of one or more unsatisfactory features, such as the presence of an occlusion or shadowing of facial features or other key features.

DESCRIPTION OF THE RELATED ART

Cameras are becoming strong computation tools. In particular, FotoNation, Inc., assignee of the present application, has developed many advantageous face detection tools. Some of these are described at U.S. patent application Ser. Nos. 10/608,776, 10/608,810, 10/764,339, 10/919,226, 11/182,718, and 11/027,001, which are hereby incorporated by reference.

This differs from using a trigger to take a picture. This also differs from waiting for an event that may or may not happen (e.g. a smile). U.S. Pat. No. 6,301,440 discloses adjusting image capture parameters based on analysis of temporary images, and awaiting taking a picture until everyone in the temporary images is smiling. The camera must await a certain event that may or may not ever happen. It is often not acceptable to make people wait for the camera to decide that a scene is optimal before taking a picture, and there is no description in the '440 patent that would alleviate such dilemma. The '440 patent also provides no guidance as to how to detect or determine certain features within a scene.

There are also security cameras that take pictures when a subject enters the view of the camera. These generally detect motion or abrupt changes in what is generally a stagnant scene.

SUMMARY OF THE INVENTION

A method is provided for disqualifying an unsatisfactory scene as an image acquisition control for a camera. An analysis of the content of the captured image determines whether the image should be acquired or discarded. One example includes human faces. It may be determined whether an image is unsatisfactory based on whether the eyes are closed, partially closed or closing down or moving up during a blinking process. Alternatively, other non-desirable or unsatisfactory expressions or actions such as frowning, covering one's face with a hand or other occluding or shadowing of a facial feature or other key feature of a scene, or rotating the head away from the camera, etc., may be detected.

A present image of a scene is acquired or captured including a face region. One or more groups of pixels is/are identified corresponding to a region of interest or a key feature within the scene, such as one or more facial features within the face region such as an eye, a nose, hair or a mouth, a portion or the entirety of the face region, or another feature within the scene. It is determined whether the key feature is occluded or shadowed. If so, then the scene is disqualified as a candidate for a processed, permanent image while the key feature is continuing to be occluded or shadowed.

The present image may include a preview image, and the disqualifying may include delaying full resolution capture of an image of the scene. The delaying may include ending the disqualifying after a predetermined wait time.

A preview image may be used. This can provide an indication of a region of interest (ROI) where the eyes may be in the captured image. This provides a fast search in the final image of key features such as faces, mouths or eyes based on spatial information provided from the analysis of preview images.

The delaying may include predicting a time when the occlusion or shadowing will no longer be present, and ending the disqualifying at approximately the predicted time. The predetermined occlusion or shadowing duration may be programmed based on an average occlusion or shadowing duration. An estimated duration may be based on analyzing a temporal capture parameter of one or more previous preview images relative to that of the present preview image. The estimating may involve a determination as to whether an occluding or shadowing object is moving away or is moving to further occlude or shadow the key feature, and a degree to which the key feature is occluded or shadowed.

The method may include determining whether the key feature is occluded or shadowed including determining a degree of the occlusion or shadowing. The degree of occlusion or shadowing may be determined based on relatively analyzing a present preview image and one or more other preview images relatively acquired within less than a duration of an occlusion or shadowing period. The duration estimate may be based on determining a degree of blurriness of an occluding or shadowing object, e.g., to determine the speed at which the object is moving into or out of the scene. It may be determined whether and to what degree the key feature is showing. A color analysis of the key feature region may be performed and pixels corresponding to the key feature versus an occluding or shadowing object differentiated. A shape analysis of the key feature region may be performed and/or pixels differentiated as corresponding to the key feature or an occlusion or shadowing of the key feature.

The present image may include a full resolution capture image. The disqualifying may include foregoing further processing of the present image. The method may include assembling a combination image including pixels from the present image and open-eye pixels corresponding to the eye that is blinking from a different image. The different image may include a preview image or a post-view image or another full resolution image. The different image may include a lower resolution than the present image, and the assembling may include upsampling the different image or downsampling the present image, or a combination thereof. The method may also include aligning the present image and the different image, including matching an open-eye pixel region to a blinking eye region in the present image.

The invention may also be implemented to disqualify images out of a selection of images that are part of a stream, such as a video stream.

The method may include determining a portion of the key feature that may be showing and/or the region wherein the key feature is expected. A color analysis and/or tonal analysis may be performed and pixels differentiated as corresponding to the key feature or not. A shape analysis may also be performed and pixels differentiated as corresponding to the key feature or not.

The present image may include a full resolution capture image. The method may include assembling a combination image including pixels from the present image and non-occluded or non-shadowed pixels corresponding to the region in the present image where the key feature is blocked or shadowed. The different image may include a preview image or a post-view image or another full resolution image. The different image may include a lower resolution than the present image, and the assembling may include upsampling the different image or downsampling the present image, or a combination thereof. The method may also include aligning the present image and the different image, including matching a non-occluded or non-shadowed region with a region where the key feature is blocked or shadowed.

A mouth region may be identified based on identifying a face region, and analyzing the face region to determine a facial feature therein, such as one or both eyes, mouth or mouth features, nose, hair, chin, cheeks, forehead, one or both ears, or combinations thereof.

A new image may be captured due to the disqualifying to replace the present image.

A pair of images may be captured and analyzed to determine that at least one of the pair of images includes no blinking.

The interval between multiple captures can be calculated to be longer than a single blink time.

A warning signal may be provided regarding the occlusion or shadowing so that the photographer may be aware that she may need to take another picture.

The invention in its various alternatives, may address single or multiple faces in a single image, such as a group shot. A second key feature of a same face or of a second face or non-facial feature may be identified within the scene. Additional features may be identified within a scene. It may be determined whether the second key feature is being occluded or shadowed. If so, then the method may include disqualifying the scene as a candidate for a processed, permanent image while the second key feature is blocked or shadowed. Capturing or further processing may be disqualified for full resolution images until the key features of each face region or other region within the scene include no key features that are occluded or shadowed.

A further method is provided for automatically disqualifying an unsatisfactory scene as an image acquisition control of a camera. The method includes acquiring multiple preview images. Information is extracted from the multiple preview images. One or more changes is/are analyzed in the scene between individual images of the multiple temporary images. Based on the analyzing, it is determined whether one or more unsatisfactory features exist within the scene. The scene is disqualified as a candidate for a processed, permanent image while the one or more unsatisfactory features continue to exist.

The analyzing may include identifying one or more groups of pixels that correspond to a key feature region that is unsatisfactorily blocked or shadowed. The one or more groups of pixels may include a face or facial feature, and the unsatisfactory configuration may include an occlusion or shadowing or other unsatisfactory configuration such as a frowning mouth or a blinking eye. A disqualifying interval may be determined during which no processed, permanent image is to be acquired.

The analyzing may include identifying one or more groups of pixels that correspond to a facial feature having an unsatisfactory configuration. The one or more groups of pixels may include any occlusions such as a hand covering the face or a face that is turned away form the camera.

One or more processor readable storage devices having processor readable code embodied thereon are also provided. The processor readable code is for programming one or more processors to perform a method of disqualifying an unsatisfactory scene as an image acquisition control for a camera, as set forth herein above or below. The processor may be embedded as part of the camera or external to the acquisition device. The acquisition device may be a hand held camera, a stationary camera, a video camera, a mobile phone equipped with a acquisition device, a hand held device equipped with a acquisition device, a kiosk booth, such as ones used for portraits, a dedicated portrait camera such as one used for security or identifications or generically, any image capture device.

DETAILED DESCRIPTION OF THE PREFERRED EMBODIMENTS

Figure 1:
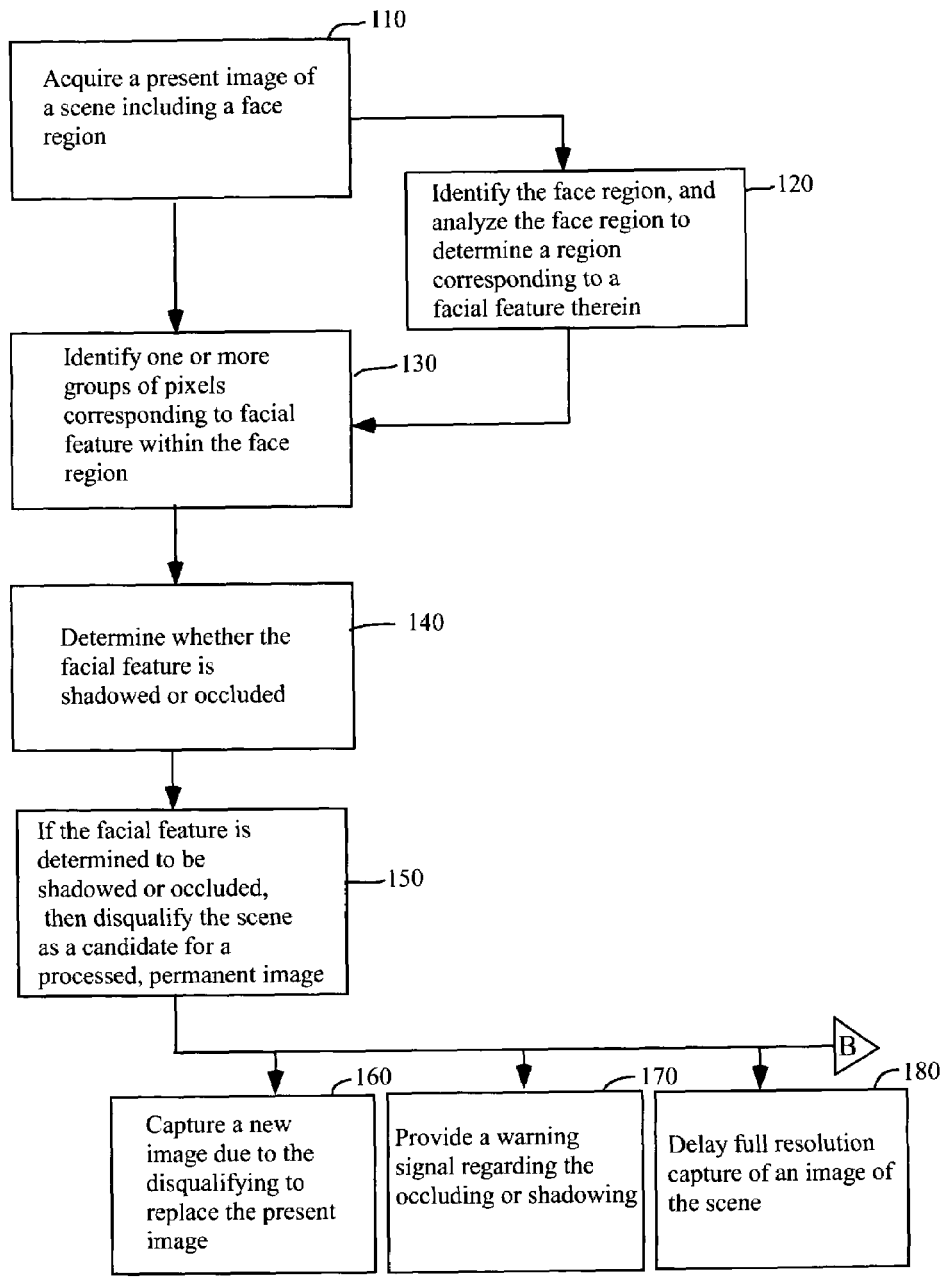
FIG. 1 illustrates a method for disqualifying a scene that includes an occluded or shadowed facial feature in accordance with a preferred embodiment.

Systems and methods are described in accordance with preferred and alternative embodiments. These techniques provide enhanced functionality and improved usability, as well as avoiding missed shots. With them, a digital camera is able to decide when a subject's facial expression may be inappropriate, unsatisfactory or non-desirable. One example is blinking, and others include frowning occlusions and shadowing. The capture device can either not take the picture, delay the acquisition for an appropriate duration, or immediately take another picture, or warn a camera user, or take steps to enhance the unsatisfactory image later, or combinations of these or other steps. The camera may delay taking another picture for a certain amount of time such as 0.1, 0.3, 0.5 or 1.0 seconds, or for an average occlusion or shadowing interval, or until the occlusion or shadowing is determined to be over. The user could be warned before snapping a picture or after the picture has been taken that the key feature was occluded or shadowed.

A predictive system is provided that disqualifies images if key features are occluded or blocked, e.g., having an interfering object blocking or shadowing the key feature, e.g., a key facial features such as an eye, mouth, nose, hair, ear, cheek, chin or a key non-facial feature, or combinations thereof. The system predicts when a picture cannot be taken, i.e., those times when a detected occlusion or shadowing process will be ongoing.

Disqualified images may be already captured and disqualified only in a post-capture filtering operation, either within the camera or on an external apparatus. The system may take multiple images to enhance the probability that one or more of the images will not be disqualified for including one or more occluded or shadowed features. Such system is useful in the case of a group shot where the probability of one subject in the process of blinking increases as the number of subjects increase. The system, based on the number of faces in the image, can automatically determine the amount of images to be sequentially taken to provide a probability that at least one of the images will have no blinking eyes that is above a threshold amount, e.g., 50%, 60%, 67%, 70%, 75%, 80%, 90% or 95%.

An image may be generated as a combination of a present image, and a preview, post-view or other full resolution image. For example, the combination image may include a face region and some background imagery, wherein a facial feature region, which is unsatisfactorily occluded or shadowed in the present image, is replaced with a similar region that is not occluded or blocked from the preview, post-view or other full resolution image. This feature may be combined with features presented in U.S. patent application Ser. No. 10/608,776, which is assigned to the same assignee as the present application and is hereby incorporated by reference. In the '776 application, a method of digital image processing using face detection is described. A group of pixels is identified that corresponds to a face within a digital image. A second group of pixels is identified that corresponds to another feature within the digital image. A re-compositioned image is determined including a new group of pixels for at least one of the face and the other feature.

The embodiments herein generally refer to a single face within a digital image or scene (e.g., prior to image capture or that may have already been digitally captured), and generally to "a facial feature". However, these descriptions can be extended to other features on a single face, or to key features other than on a face. Herein facial features are generally referred to in describing preferred and alternative embodiments with reference to the drawings, but the descriptions may be applied to other key features or people, animals, vehicles, boats, landscapes, seascapes, natural or artificial objects planets or other celestial objects, objects of interest in surveillance activities, or otherwise. These descriptions can be extended to more than a single face (group shot) or key feature, and the camera can disqualify the scene if a certain number of one or two, three, four or more faces or other key features are determined to be occluded or shadowed, e.g., in a group shot including 20 people, it may be permissible to have one or two occluded or shadowed faces such that a threshold of three non-occluded or shadowed features are set before the scene will be disqualified. The camera is able to perform the disqualifying and/or other operations, as described herein or otherwise, until a high percentage or all of the key features are non-occluded and/or non-shadowed. The degree of shadowing or occlusion may also be determined such that when a key feature is occluded or shadowed less than a threshold amount, then the scene may be still considered qualified even though a key feature may be partially occluded or partially shadowed.

In one embodiment, the camera will take the picture right after the subject stops being shadowed or occluded. The present system can be used to disqualify an image having a key feature that is occluded or shadowed, and can take multiple images to prevent having no images that are not occluded or shadowed, that is, to better ensure that at least one image will include the key feature and not be occluded or shadowed. One of the images will likely have a non-occluded or non-shadowed key feature, e.g., facial feature, for each subject person, and the pictures can have a mixture of pixels combined into a single image with no occluded or shadowed key features. The camera may decide on the number of images to take based on the number of subjects in the image. The more people, the higher the likelihood of one person blinking, thus more images should be acquired. If it is acceptable for efficiency that a certain percentage of persons may be blinking in a large group shot, e.g., that is below a certain amount, e.g., 5%, then the number of images can be reduced. These threshold numbers and percentage tolerances can be selected by a camera product manufacturer, program developer, or user of a digital image acquisition apparatus. This information may be generated based on analysis of preview images. The preview image may also assist in determining the location of the eyes, so that the post processing analysis can be faster honing into the region of interest as determined by the preview analysis.

The present system sets a condition under which a picture will not be taken or will not be used or further processed after it has already been taken, and/or where an additional image or images will be taken to replace the unsatisfactory image. Thus, another advantageous feature of a system in accordance with a preferred embodiment is that it can correct an acquired occluded or shadowed region with a facial feature or other key feature from a preview or post-view image or another full resolution image. The present system preferably uses preview images, which generally have lower resolution and may be processed more quickly. The present system can also look for changes in facial or other key features (e.g., of the eyes or mouth), between images as potentially triggering a disqualifying of a scene for an image capture.

The description herein generally refers to handling a scene wherein an object person has a facial feature that is blocked or occluded. However, the invention may be applied to other features, e.g., when a person is blinking or frowning, or when a person is unsatisfactorily gesturing, talking, eating, having bad hair, or otherwise disposed, or when another person is putting bunny ears on someone, or an animal or other person unexpectedly crosses between the camera and human subject, or the light changes unexpectedly, or the wind blows, or there is a partial blocking or partial shadowing of a key feature, or otherwise. One or more or all of these disqualifying circumstances may be manually set and/or overridden.

Figure 4A:
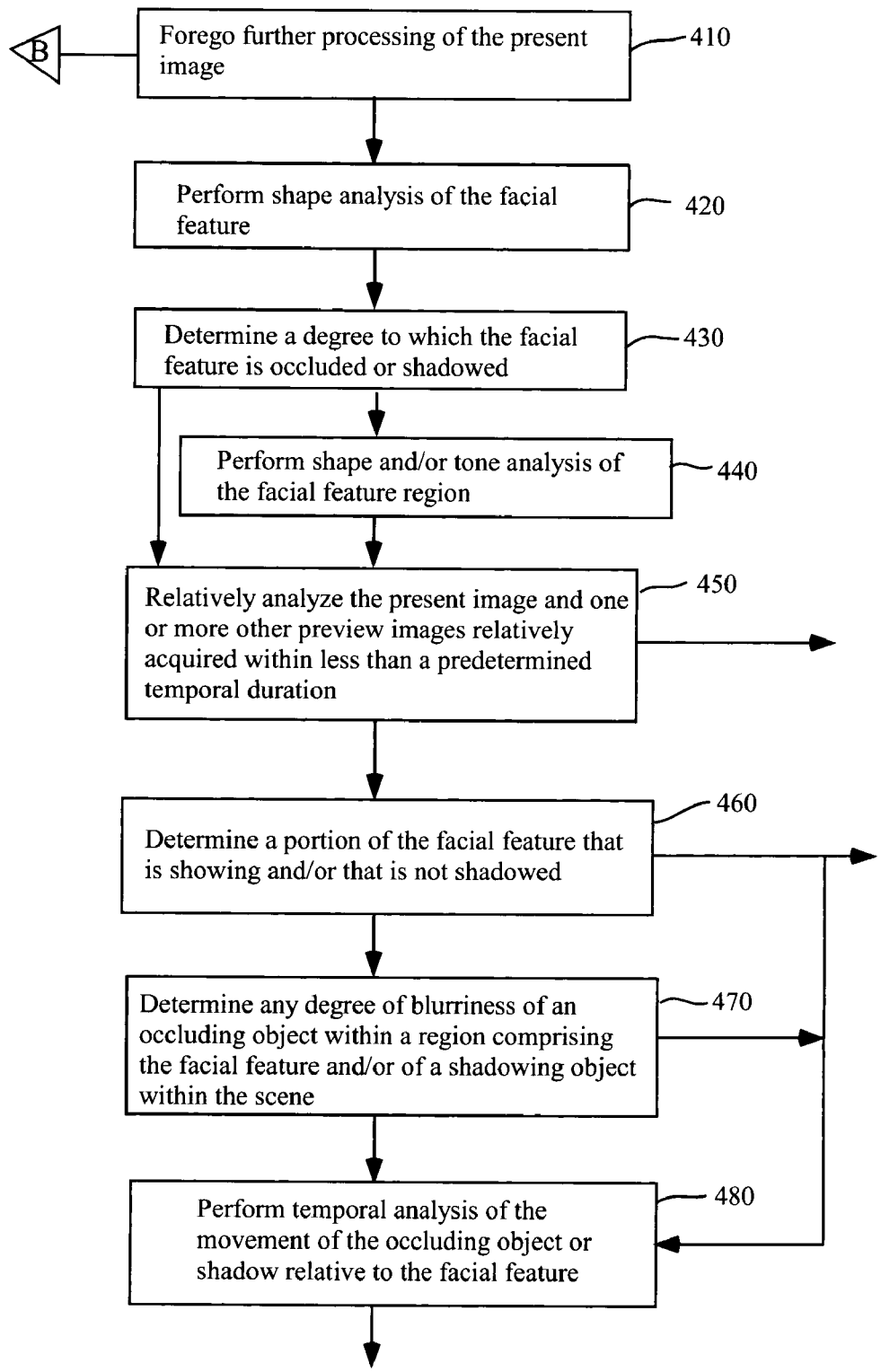
FIG. 4a illustrates a method of determining whether to forego further processing of an image in accordance with a preferred embodiment.
Figure 4B:
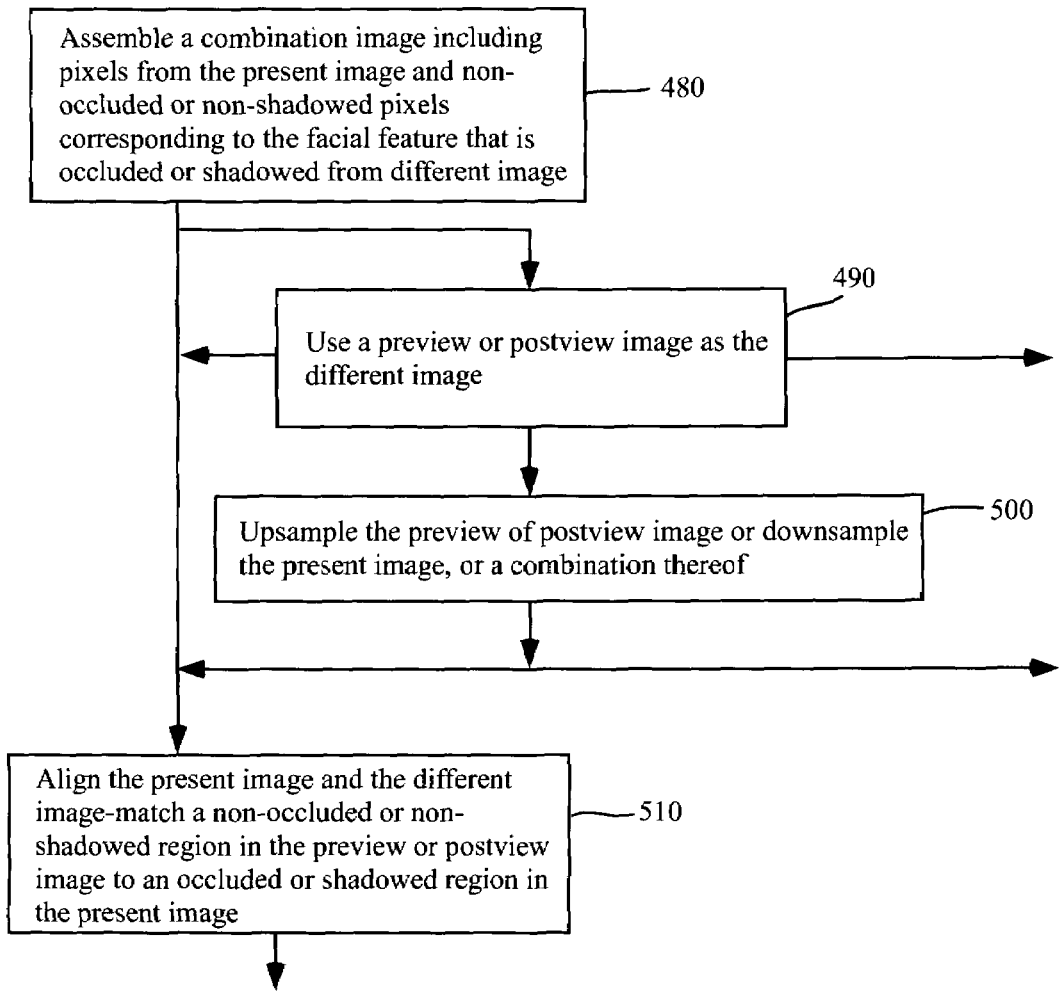
FIG. 4b illustrates a method of assembling a combination image in accordance with a preferred embodiment.

FIG. 1 illustrates a method for disqualifying a scene that includes a facial feature that is occluded or shadowed in accordance with a preferred embodiment. A present image of a scene including a face region is acquired at 110. Optionally, the face region is identified at 120, and the face region analyzed to determine a facial feature region therein. One or more groups of pixels corresponding to a selected or predetermined facial feature region within the face region are identified at 130. It is determined whether the facial feature region is being blocked or shadowed at 140. If the facial feature is determined to be blocked or shadowed at 140, then the scene is disqualified as a candidate for a processed, permanent image at 150. At this point, the process can simply stop or start again from the beginning, or a new image may be captured due to the disqualifying in order to replace the present image at 160. A warning signal may be provided regarding the occlusion or shadowing at 170. Full resolution capture of an image of the scene may be delayed at 180. As illustrated at FIGS. 4A and 4B, further processing of a present image may be stopped or a combination image may be assembled as a way of enhancing the disqualified image.

Figure 2:
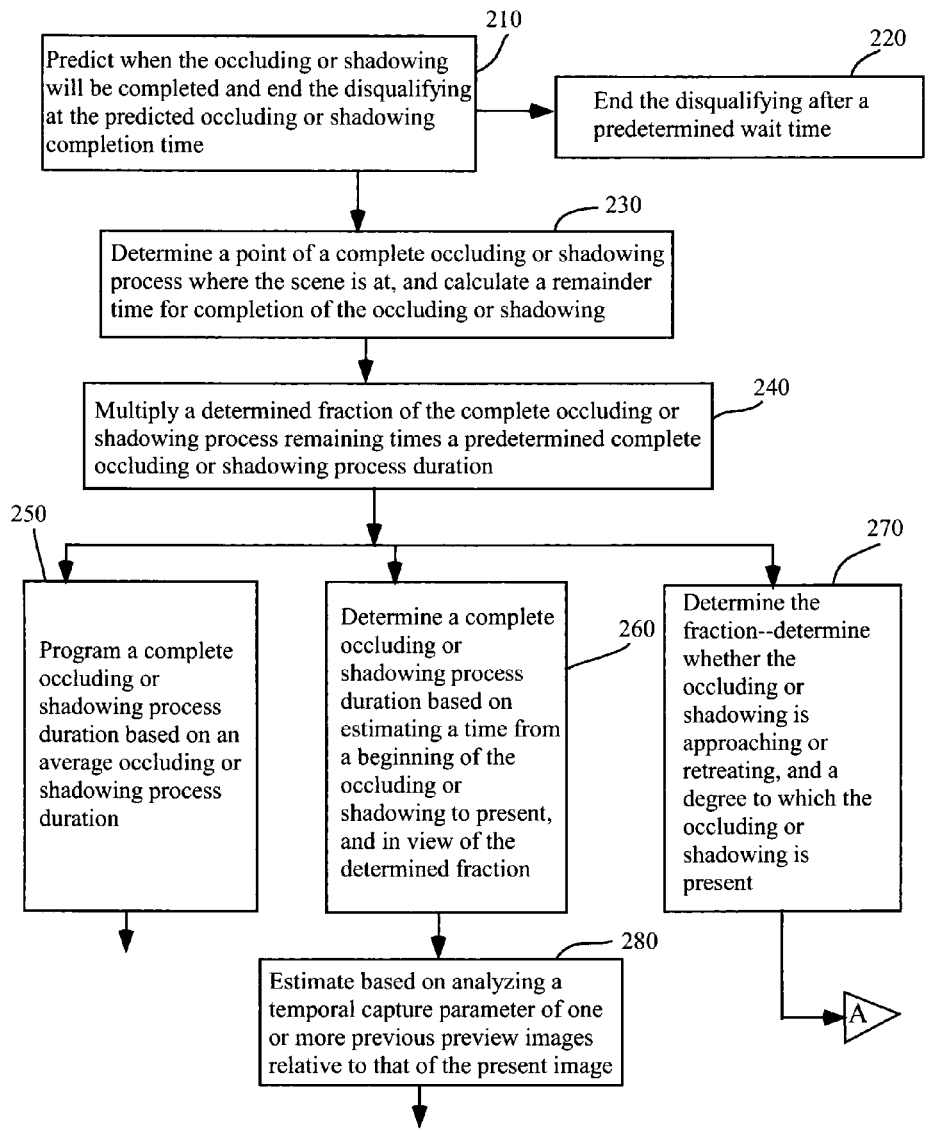
FIG. 2 illustrates a method of predicting an occluding or shadowing time interval in accordance with a preferred embodiment.

FIG. 2 illustrates a method of predicting when the occlusion or shadowing will end in accordance with a preferred embodiment. It is predicted when the occluding or shadowing will end at 210, and the disqualifying interval will end at the predicted occluding or shadowing stop time. The interval may be set at a predetermined wait time 220. This may be set from a knowledge of an average occlusion or shadowing duration of a second, or two seconds, or half a second, or so, or in a range from approximately 0.2 to 2.0 seconds, or to 0.4, 0.5, 0.8, 1.0, 1.2 or 1.5 seconds, however setting the wait time too long to ensure the occluding or shadowing is complete can disadvantageously permit a second occlusion or shadowing to begin or simply makes everyone involved in taking the picture have to wait to too long for the disqualifying period to end. A more precise determination of the end of the occlusion or shadowing is desired and provided herein.

A degree to which a facial feature is blocked or shadowed is provided at 230. The process of FIG. 3 may follow. It may be determined at 270 whether an object causing the blocking or shadowing is moving, and if so, in what direction. An occlusion or shadowing stop time may be estimated at 280 based on analyzing a temporal capture parameter of one or more preview images relative to that of the present image.

Figure 3:
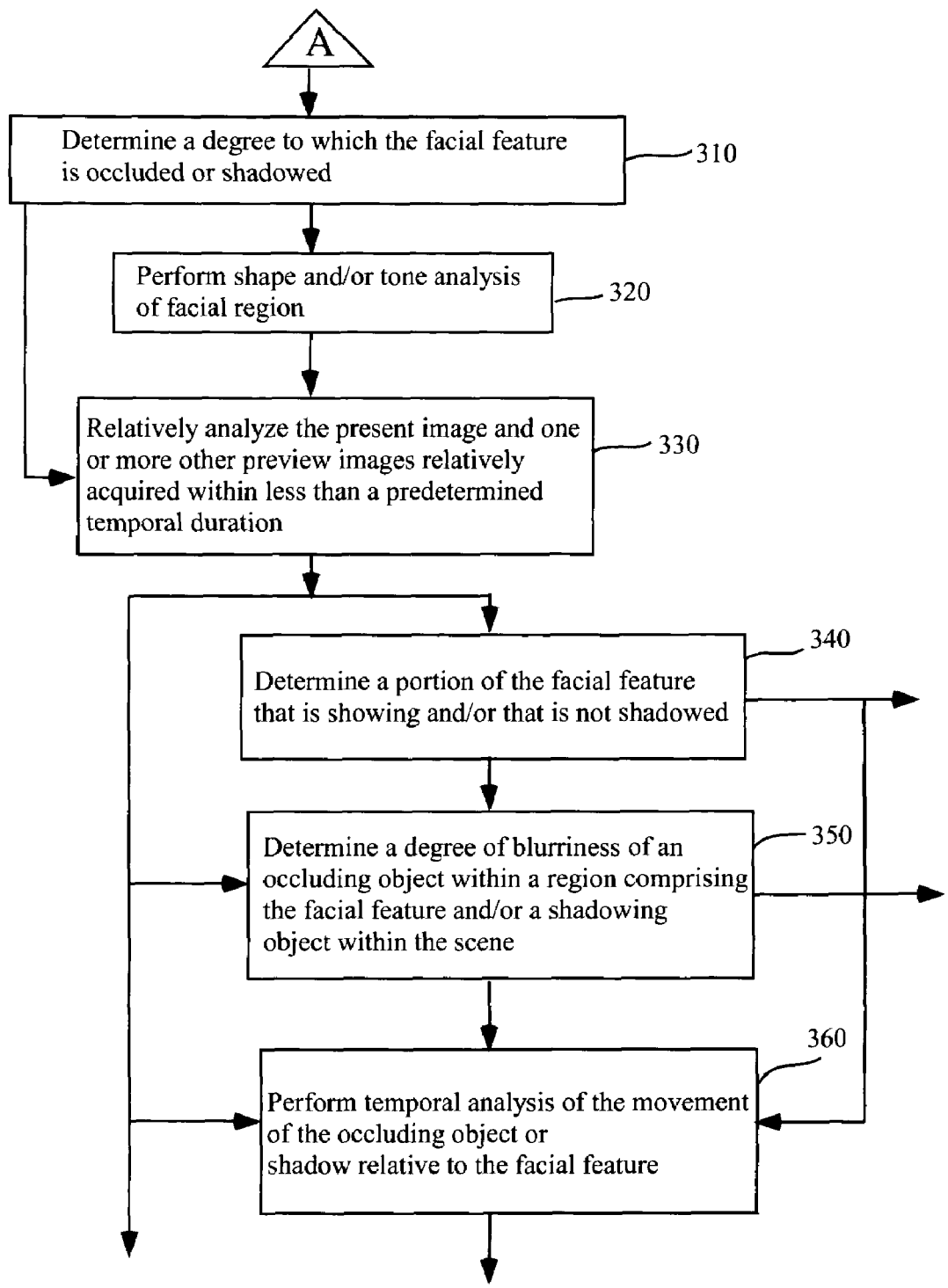
FIG. 3 illustrates a method of determining a degree to which a facial feature is occluded or shadowed in accordance with a preferred embodiment.

A degree to which a facial feature is blocked or shadowed is further provided at 310 of FIG. 3. For occlusions, the degree will depend on what percentage of the facial feature is showing, while for shadowing, the degree of brightness of the facial feature along with the percentage of the feature that is shadowed may be considered separately or in combination. Shape analysis 360 may be preferably performed to differentiate pixels corresponding to facial features from pixels corresponding to occluding and/ir shadowing objects. The present image is preferably analyzed at 330 relative to one or more other preview images acquired within less than a duration of an occlusion or shadowing period. A portion of a facial feature or other key feature that is showing may be determined at 340 to facilitate determining to what degree the occlusion or shadowing is present. An optional determination of a degree of blurriness at 350 of an occluding or shadowing object may facilitate a determination of object speed for determining when the occluding or shadowing may end. Color analysis 360 may also be performed to differentiate pixels corresponding to key features from pixels corresponding to occluding or shadowing objects.

FIG. 4a illustrates a method of determining whether to forego further processing of an image 410 in accordance with a preferred embodiment. In this case, determining a degree to which a key feature is blocked or shadowed 420 is performed for a different purpose than to compute an occlusion or shadowing stop time. In this embodiment, a threshold degree of occluding or shadowing may be preset, e.g., such that when an image is analyzed according to 420, 430, 440, 450, 460, 470 or 480, or combinations thereof, similar to any or a combination of 310-360 of FIG. 3, then if the feature is occluded or shadowed to at least the threshold degree or greater, then the scene is disqualified, because the feature is being occluded or shadowed too much or is substantially occluded or shadowed. This can correspond to a situation wherein a key feature is not blocked or shadowed, or where the feature is at the very start or very end of an occluding or shadowing event, such that the degree to which the feature is blocked or shadowed is insufficient to disqualify the image.

FIG. 4b illustrates a method of assembling a combination image in accordance with a preferred embodiment. At 480, a combination image is assembled including pixels from a present image and non-occluded or non-shadowed feature pixels from a different image that correspond to the feature that is occluded or shadowed in the present image. The different image may be a preview or postview image 490. In this case, particularly if the preview or postview image has lower resolution than the present image, then at 500 the preview image may be upsampled or the postview image may be downsampled, or a combination thereof. The present image and the different image are preferably aligned at 510 to match the non-occluded or non-shadowed pixel region in the preview of postview image to the occluded or shadowed region in the present image.

Figure 5:
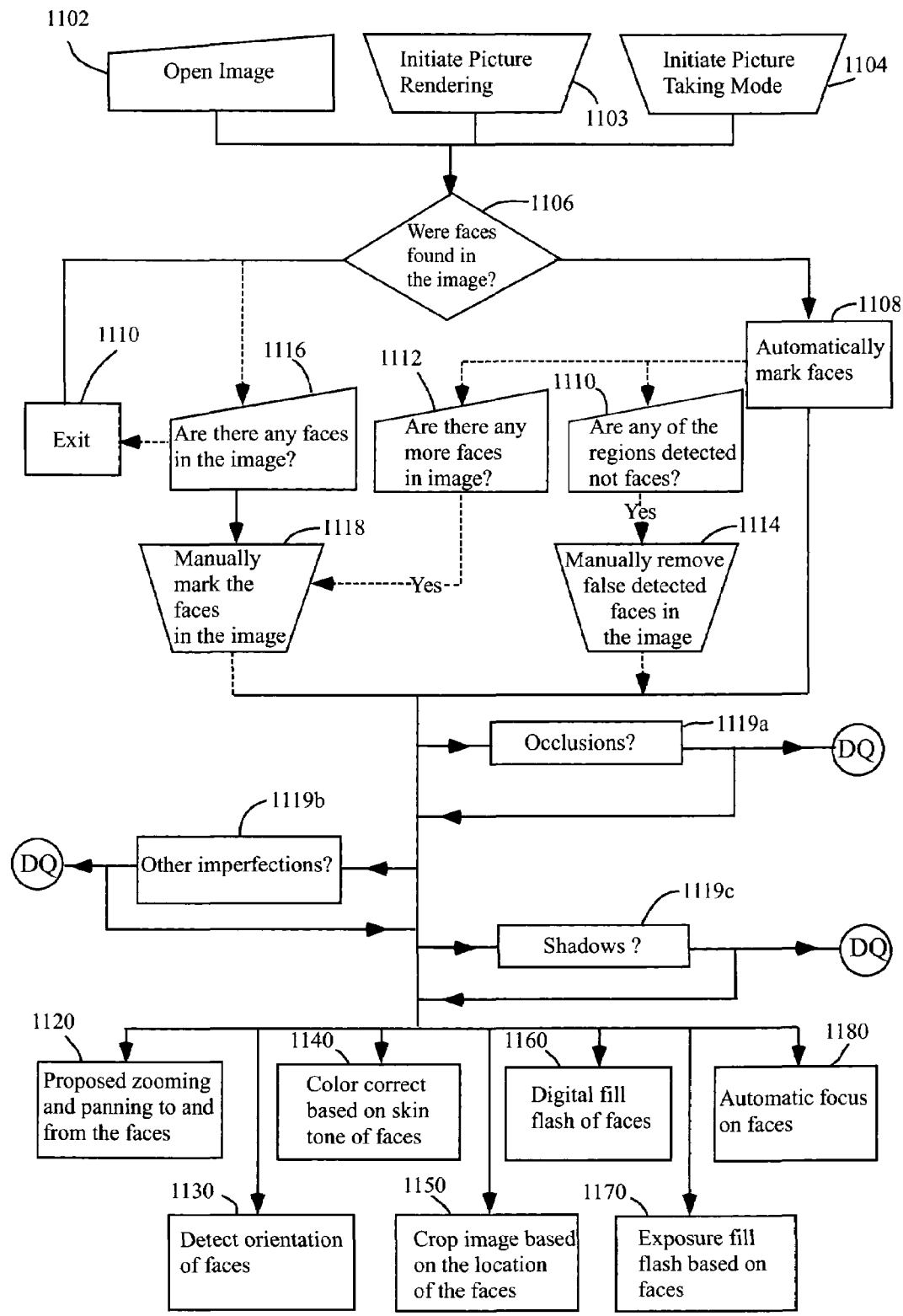
FIG. 5 illustrates a preferred embodiment of a workflow of correcting images based on finding occlusions or shadows of key features in the images.

FIG. 5 illustrates further embodiments. If one or more key features, particularly facial features, are determined to be blocked or shadowed in an image, then that image is preferably disqualified from being further processed in accordance with the following. Alternatively, the occlusion or shadowing determination 140 may be performed somewhere along the way, such as illustrated as an example in FIG. 5. An image may be opened by the application in block 1102. The software then determines whether faces or facial features, or both, or other key features, are in the picture as described in block 1106. If no such features are detected, the software ceases to operate on the image and exits 1110. In what follows, only facial features will be generally referred to for efficiency, but either faces or facial features or other non-facial key features or combinations thereof, may be the object or objects of particular operations (see FIG. 1, 110, 120 and 130 and U.S. application Ser. No. 10/608,776, which is incorporated by reference).

The software may also offer a manual mode, where the user, in block 1116 may inform the software of the existence of facial features, and manually marks them in block 1118. The manual selection may be activated automatically if no facial features are found, 1116, or it may even be optionally activated after the automatic stage to let the user, via some user interface to either add more facial features to the automatic selection 1112 or even 1114, remove regions that are mistakenly 1110 identified by the automatic process 1118 as facial features. Additionally, the user may manually select an option that invokes the process as defined in 1106. This option is useful for cases where the user may manually decide that the image can be enhanced or corrected based on the detection of the key features. Various ways that the key features may be marked, whether automatically of manually, whether in the camera or by the applications, and whether the command to seek the features in the image is done manually or automatically, are all included in preferred embodiments herein. In a preferred embodiment, faces are first detected, and then one or more facial features are detected within each face.

In an alternative embodiment, the feature detection software may be activated inside the camera as part of the acquisition process, as described in Block 1104. In this scenario, the feature detection portion 1106 may be implemented differently to support real time or near real time operation. Such implementation may include sub-sampling of the image, and weighted sampling to reduce the number of pixels on which the computations are performed. This embodiment is further described with reference to FIG. 6a. In an alternative embodiment, the eye detection can then also make use of information provided from preview images to determine the location of the eyes in preview, thus expediting the analysis being performed in a smaller region on the final image.

In an alternative embodiment, the feature detection software may be activated inside the rendering device as part of the output process, as described in Block 1103. In this scenario, the feature detection portion 1106 may be implemented either within the rendering device, using the captured image or using a single or plurality of preview images or within an external driver to such device. This embodiment is further described with reference to FIG. 6b.

After the faces, facial features and/or other features are tagged, or marked, whether manually as defined in 1118, or automatically 1106, the software is ready to operate on the image based on the information generated by the facial feature detection, face detection, or other feature-detection stage. The tools can be implemented as part of the acquisition, as part of the post-processing, or both. As previously averred to, occlusion or shadowing determination may be performed at this point at 140 (see FIGS. 1-4b and above). The image may be disqualified at 1119 if sufficient occlusion or shadowing is found, such that processing as known to one familiar in the art of digital photography is efficiently foregone.

Block 1120 describes panning and zooming into the facial features or faces. This tool can be part of the acquisition process to help track the facial features or faces or other features and create a pleasant composition, or as a post processing stage for either cropping an image or creating a slide show with the image, which includes movement.

Block 1130 depicts the automatic orientation of the image, a tool that can be implemented either in the camera as part of the acquisition post processing, or on a host software.

Block 1140 describes the way to color-correct the image based on the skin tones of the faces or facial feature tones or other feature tones. This tool can be part of the automatic color transformations that occur in the camera when converting the image from the RAW sensor data form onto a known, e.g. RGB representation, or later in the host, as part of an image enhancement software. The various image enhancement operations may be global, affecting the entire image, such as rotation, and/or may be selective based on local criteria. For example, in a selective color or exposure correction as defined in block 1140, a preferred embodiment includes corrections done to the entire image, or only to the face or facial or other key feature regions in a spatially masked operation, or to specific exposure, which is a luminance masked operation. Note also that such masks may include varying strength, which correlates to varying degrees of applying a correction. This allows a local enhancement to better blend into the image.

Block 1150 describes the proposed composition such as cropping and zooming of an image to create a more pleasing composition. This tool 1150 is different from the one described in block 1120 where the facial features or faces, or occluding or shadowing objects, are anchors for either tracking the subject, object or shadow, or providing camera movement based on face or feature location or on occluding or shadowing object location or the location of a shadow.

Block 1160 describes the digital-fill-flash simulation which can be done in the camera or as a post processing stage. Alternatively to the digital fill flash, this tool may also be an actual flash sensor to determine if a fill flash is needed in the overall exposure as described in Block 1170. In this case, after determining an overall exposure of the image, if the detected faces or facial or other key features in the image are in the shadow, a fill flash may be automatically used. Note that the exact power of the fill flash, which should not necessarily be the maximum power of the flash, may be calculated based on the exposure difference between the overall image and the faces or other features. Such calculation may be based on a tradeoff between aperture, exposure time, gain and flash power.

Block 1180 describes the ability of the camera to focus on facial features, faces or other key features, or on occluding or shadowing objects or shadows. This can be used as a pre-acquisition focusing tool in the camera or for delaying capture or otherwise (see 160, 170, 180 at FIG. 1).

Figure 6A:
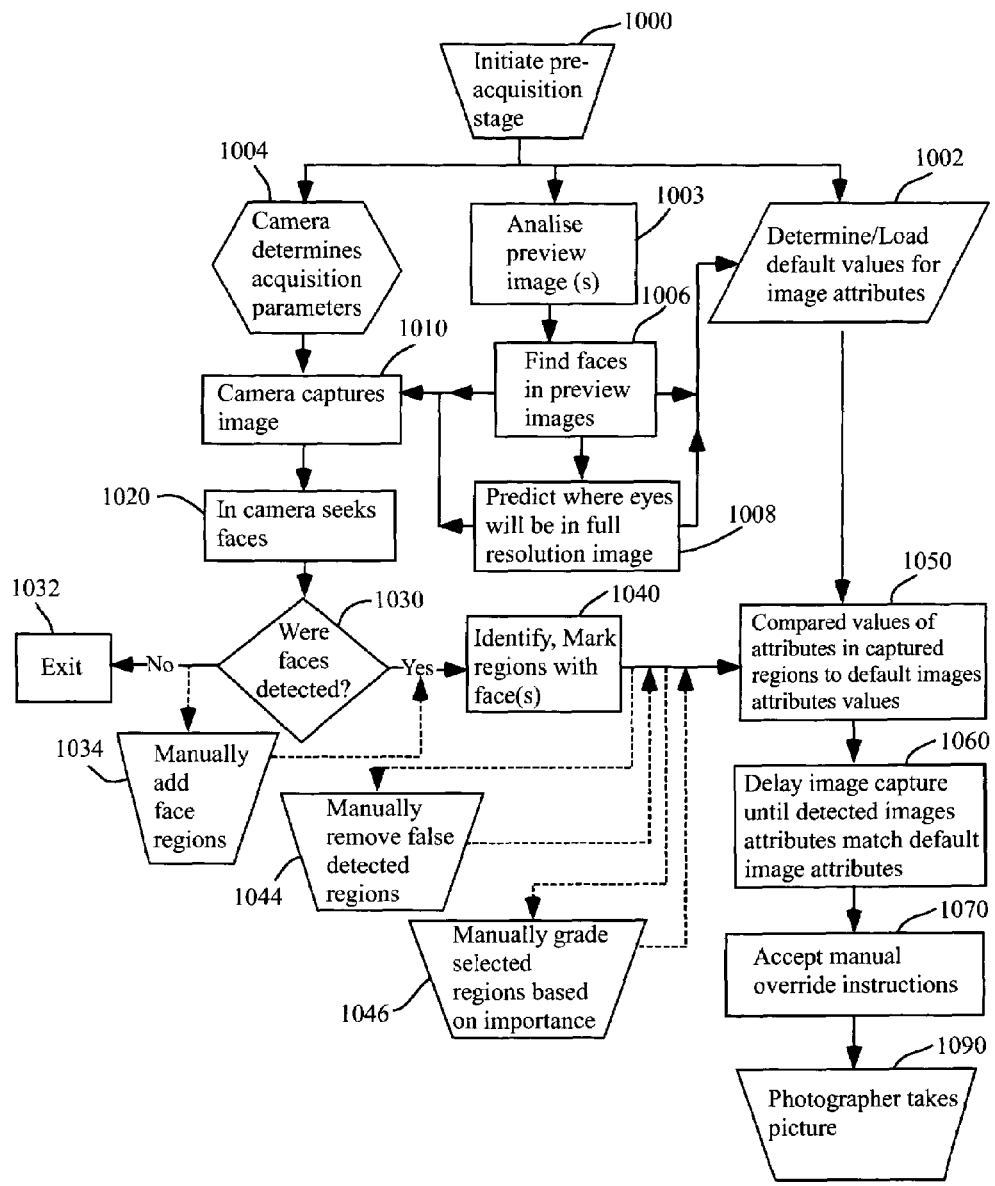
FIG. 6a illustrates a generic workflow of utilizing key feature information in an image to delay image acquisition in accordance with a preferred embodiment.

Referring to FIG. 6a, which describes a process of using face detection to improve in camera acquisition parameters, as aforementioned in FIG. 5, block 1106. In this scenario, a camera is activated at 1000, for example by means of half pressing the shutter, turning on the camera, etc. The camera then goes through the normal pre-acquisition stage to determine at 1004 the correct acquisition parameters such as aperture, shutter speed, flash power, gain, color balance, white point, or focus. In addition, a default set of image attributes, particularly related to potential faces or other features in the image, are loaded at 1002. Such attributes can be the overall color balance, exposure, contrast, orientation etc. Alternatively, at 1003, a collection of preview images may be analyzed to determine the potential existence of faces in the picture at 1006. A region wherein potentially the eyes will be when the full resolution is captured may also be predicted at 1008. This alternative technique may include moving on to block 1010 and/or 1002.

An image is then digitally captured onto the sensor at 1010. Such action may be continuously updated, and may or may not include saving such captured image into permanent storage.

An image-detection process, preferably a face detection process, as known to one familiar in the art of image classification and face detection in particular, is applied to the captured image to seek facial features, faces or other features in the image at 1020. Such face detection techniques, include, but are not limited to: knowledge-based; feature-invariant; template-matching; appearance-based; color or motion cues; adaboost-based face detector, Viola-Jones, etc.

If no images are found, the process terminates at 1032. Alternatively, or in addition to the automatic detection of 1030, the user can manually select 1034 detected faces or other features, using some interactive user interface mechanism, by utilizing, for example, a camera display. Alternatively, the process can be implemented without a visual user interface by changing the sensitivity or threshold of the detection process. Alternatively, this data may be available form a pre-capture process 1003.

When facial or other predetermined or selected features are detected, 1040, they are marked, and labeled. Detecting defined in 1040 may be more than a binary process of selecting whether a feature is detected or not, it may also be designed as part of a process where each of the facial features is given a weight based on size of the facial features, location within the frame, or other parameters described herein, which define the importance of the feature in relation to features detected.

Alternatively, or in addition, the user can manually deselect regions 1044 that were wrongly false detected as key features. Such selection can be due to the fact that a feature was false detected or when the photographer may wish to concentrate on one of the features as the main subject matter and not on other features. Alternatively, 1046 the user may re-select, or emphasize one or more features to indicate that these features have a higher importance in the calculation relative to other features. This process as defined in 1046 further defines the preferred identification process to be a continuous value one as opposed to a binary one. The process can be done utilizing a visual user interface or by adjusting the sensitivity of the detection process.

After the faces or other key features are correctly isolated at 1040 their attributes are compared at 1050 to default values that were predefined in 1002. Such comparison will determine a potential transformation between the two images, in order to reach the same values. The transformation is then translated to the camera capture parameters 1070 and the image is acquired 1090.

A practical example is that if a captured face is too dark, the acquisition parameters may change to allow a longer exposure, or open the aperture. Note that the image attributes are not necessarily only related to face or key feature regions but can also be in relations to the overall exposure. As an exemplification, if the overall exposure is correct but the faces are underexposed, the camera may shift into a fill-flash mode.

At 1060, capture is delayed until detected image attributes match default image attributes. An example in accordance with a preferred embodiment is to delay capture until features are not occluded or shadowed, and occluding or shadowing objects are no longer present. At 1070, manual override instructions may be entered to take the picture anyway, or to keep a picture or to continue processing of a picture, even though occluding or shadowing is detected within the picture. The picture is taken at 1090, or in accordance with another embodiment, the picture is stored in full resolution.

Figure 6B:
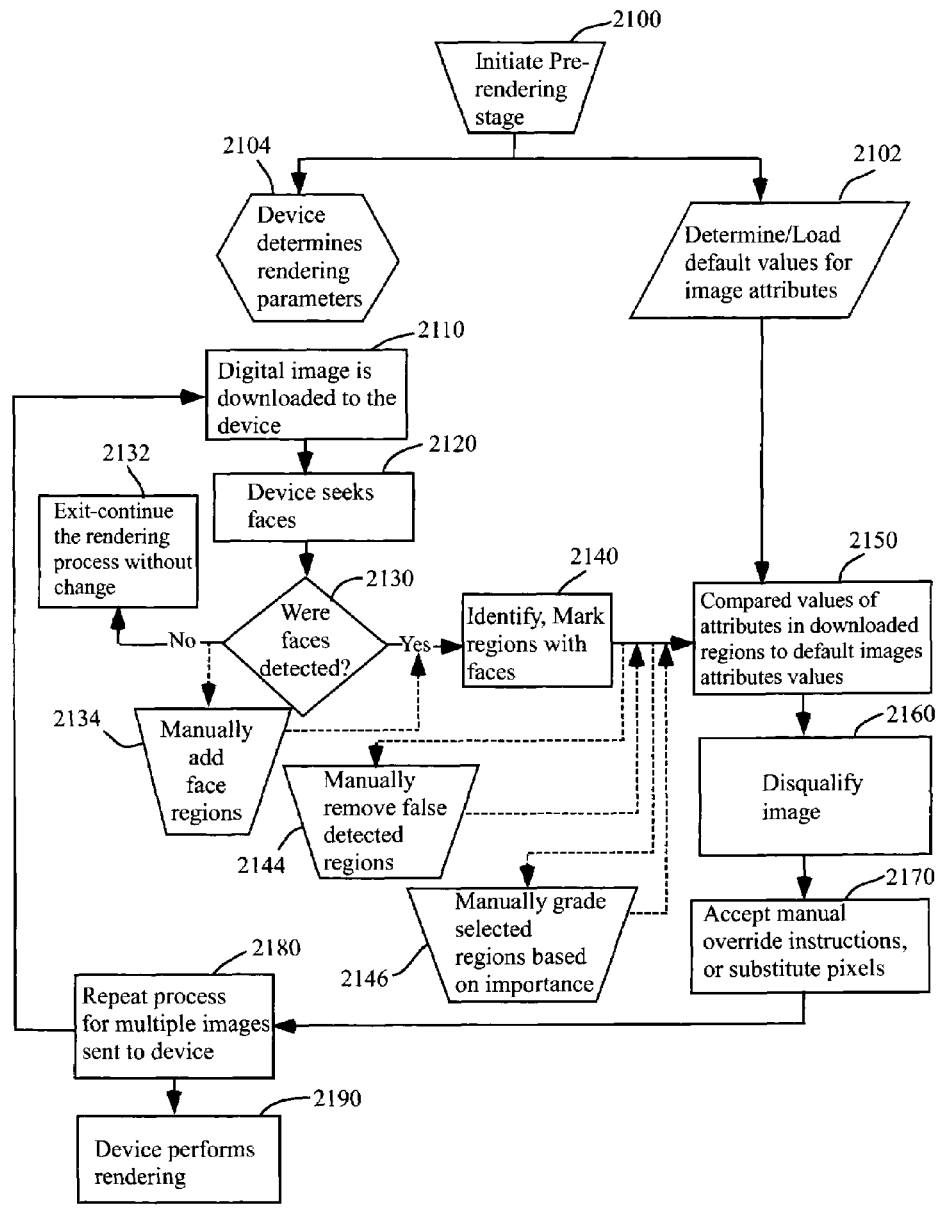
FIG. 6b illustrates a generic workflow of utilizing face information in a single or a plurality of images to adjust the image rendering parameters prior to outputting the image in accordance with a preferred embodiment.

Referring to FIG. 6b, a process is described for using face or other key feature detection to improve output or rendering parameters, as aforementioned in FIG. 5, block 1103. In this scenario, a rendering device such as a printer or a display, hereinafter referred to as "the device" is activated at 2100. Such activation can be performed for example within a printer, or alternatively within a device connected to the printer such as a PC or a camera. The device then goes through a normal pre-rendering stage to determine at 2104, the correct rendering parameters such as tone reproduction, color transformation profiles, gain, color balance, white point and resolution. In addition, a default set of image attributes, particularly related to potential facial features or faces in the image, are loaded at 2102. Such attributes can be the overall color balance, exposure, contrast, or orientation, or combinations thereof.

An image is then digitally downloaded onto the device 2110. An image-detection process, preferably a facial feature or a face detection process, is applied to the downloaded image to seek facial features or faces in the image at 2120. If no images are found, the process terminates at 2132 and the device resumes its normal rendering process. Alternatively, or in addition to the automatic detection of 2130, the user can manually select 2134 detected facial features or faces or other features, using some interactive user interface mechanism, by utilizing, for example, a display on the device. Alternatively, the process can be implemented without a visual user interface by changing the sensitivity or threshold of the detection process.

When faces or other key features such as facial features are detected at 2130, they are marked at 2140, and labeled. Detecting in 2130 may be more than a binary process of selecting whether a facial feature or a face is detected or not. It may also be designed as part of a process where each of the facial features or faces is given a weight based on size of the faces or facial or other key features, location within the frame, other parameters described herein, etc., which define the importance of the feature in relation to other features detected.

Alternatively, or in addition, the user can manually deselect regions at 2144 that were wrongly false detected as key features or faces. Such selection can be due to the fact that a feature was false detected or when the photographer may wish to concentrate on a feature as the main subject matter and not on other features. Alternatively, 2146, the user may re-select, or emphasize one or more features such as faces to indicate that these features have a higher importance in the calculation relative to other features. This process as defined in 1146, further defines the preferred identification process to be a continuous value one as opposed to a binary one. The process can be done utilizing a visual user interface or by adjusting the sensitivity of the detection process.

After the facial features or faces or other scene or image features are correctly isolated at 2140, their attributes are compared at 2150 to default values that were predefined in 2102. At least one preferred attribute that the process is looking for is a key feature that is occluded or shadowed. Such comparison will determine a potential transformation between the two images, in order to reach the same values. The image may be disqualified at 2160 if one or more key features are determined to be occluded or shadowed. The disqualifying may be overridden manually at 2170 or non-occluded or non-shadowed features may be substituted from a different image. The transformation may be translated to the device rendering parameters, and the image at 2190 may be rendered. The process may include a plurality of images. In this case at 2180, the process repeats itself for each image prior to performing the rendering process. A practical example is the creation of a thumbnail or contact sheet which is a collection of low resolution images, on a single display instance.

A practical example is that if the key feature were too darkly captured, the rendering parameters may change the tone reproduction curve to lighten the feature. Note that the image attributes are not necessarily only related to the key feature regions, but can also be in relation to an overall tone reproduction.

Referring to FIGS. 7a-7d, which describe automatic rotation of an image based on the location and orientation of mouths, eyes, faces, other face features, or other non-facial features, as highlighted in FIG. 5 at Block 1130. An image of two faces is provided in FIG. 7a. Note that the faces may not be identically oriented, and that the faces may be occluding. In this case, both eyes are showing on each face, but only one eye might be showing. Also, both mouths are showing, but one or both could be missing in other scenes.

The software in a face detection stage, including the functionality of FIG. 5, blocks 1108 and 1118, will mark the two faces or the two mouths or four eyes of the mother and son, e.g., the faces may be marked as estimations of ellipses 2100 and 2200, respectively. Using known mathematical means, such as the covariance matrices of the ellipses, the software will determine the main axes of the two faces 2120 and 2220, respectively as well as the secondary axis 2140 and 2240. Even at this stage, by merely comparing the sizes of the axes, the software may assume that the image is oriented 90 degrees, in the case that the camera is in landscape mode, which is horizontal, or in portrait mode which is vertical or +90 degrees, aka clockwise, or −90 degrees aka counter clockwise. Alternatively, the application may also be utilized for any arbitrary rotation value. However, this information may not suffice to decide whether the image is rotated clockwise or counter-clockwise.

Figure 7A:
FIGS. 7a-7d illustrate face, eye, mouth or other facial feature detection, or combinations thereof, in accordance with one or more preferred embodiments.
Figure 7B:
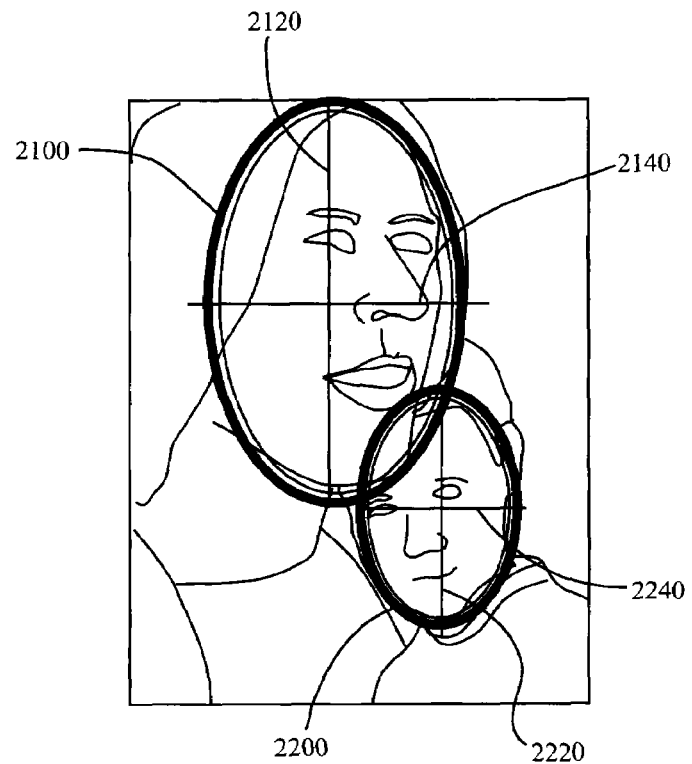
Figure 7C:
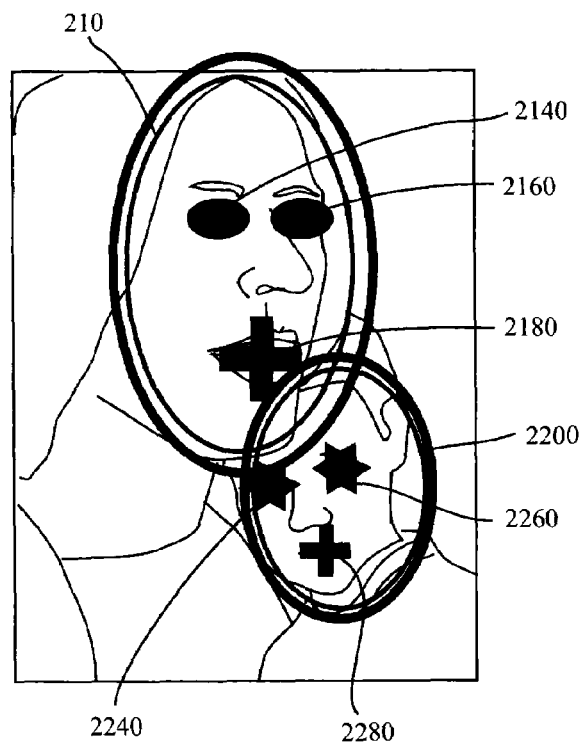

FIG. 7c describes the step of extracting the pertinent features of a face, which are usually highly detectable. Such objects may include the eyes, 2140, 2160 and 2240, 2260, and the lips, 2180 and 2280, or the nose, eye brows, eye lids, features of the eyes, hair, forehead, chin, ears, etc. The combination of the two eyes and the center of the lips creates a triangle 2300 which can be detected not only to determine the orientation of the face but also the rotation of the face relative to a facial shot. Note that there are other highly detectable portions of the image which can be labeled and used for orientation detection, such as the nostrils, the eyebrows, the hair line, nose bridge and the neck as the physical extension of the face, etc. In this figure, the eyes and lips are provided as an example of such facial features Based on the location of the eyes, if found, and the mouth, the image might ought to be rotated in a counter clockwise direction. It can be determined whether a facial feature is being occluded by an object or shadowed based shape, tone or motion analysis.

Note that it may not be enough to just locate the different facial features, but such features may be compared to each other. For example, the color of the eyes may be compared to ensure that the pair of eyes originated from the same person or to ensure there is no occlusion. Alternatively, the features of the face may be compared with preview images. Such usage may prevent a case where a double upper eyelid may be mistaken to a semi closed eye.

Figure 7D:
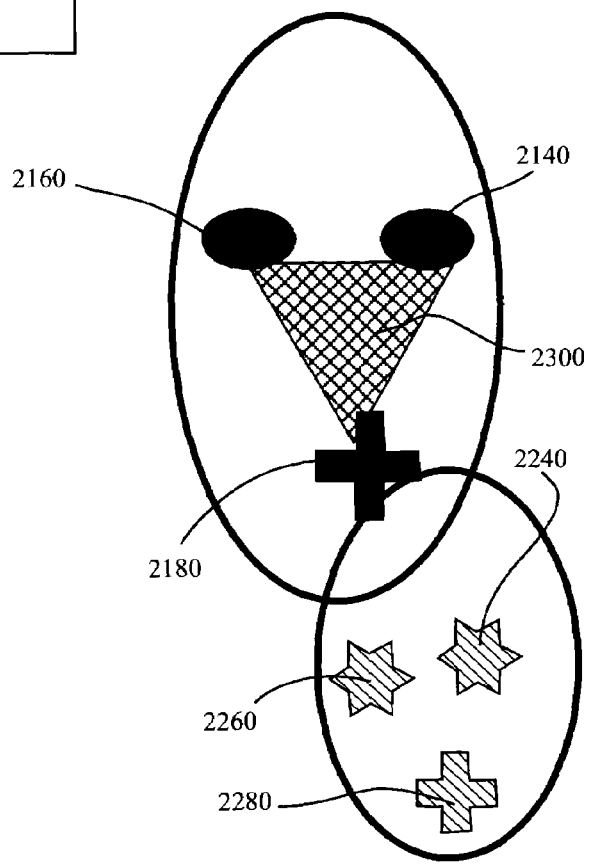

Another example is that in FIGS. 7c and 7d, if the software combined the mouth of 2180 with the eyes of 2260, 2240, the orientation would have been determined as clockwise. In this case, the software detects the correct orientation by comparing the relative size of the mouth and the eyes. The above method describes exemplary and illustrative techniques for determining the orientation of the image based on the relative location of the different facial objects. For example, it may be desired that the two eyes should be horizontally situated, the nose line perpendicular to the eyes, the mouth under the nose etc. Alternatively, orientation may be determined based on the geometry of the facial components themselves. For example, it may be desired that the eyes are elongated horizontally, which means that when fitting an ellipse on the eye, such as described in blocs 2140 and 2160, it may be desired that the main axis should be horizontal. Similar with the lips which when fitted to an ellipse the main axis should be horizontal. Alternatively, the region around the face may also be considered. In particular, the neck and shoulders which are the only contiguous skin tone connected to the head can be an indication of the orientation and detection of the face.

The process for determining an orientation of images can be implemented in a preferred embodiment as part of a digital display device. Alternatively, this process can be implemented as part of a digital printing device, or within a digital acquisition device.

The process can also be implemented as part of a display of multiple images on the same page or screen such as in the display of a contact-sheet or a thumbnail view of images. In this case, the user may approve or reject the proposed orientation of the images individually or by selecting multiple images at once. In the case of a sequence of images, the orientation of images may be determined based on the information as approved by the user regarding previous images.

Figure 8A:
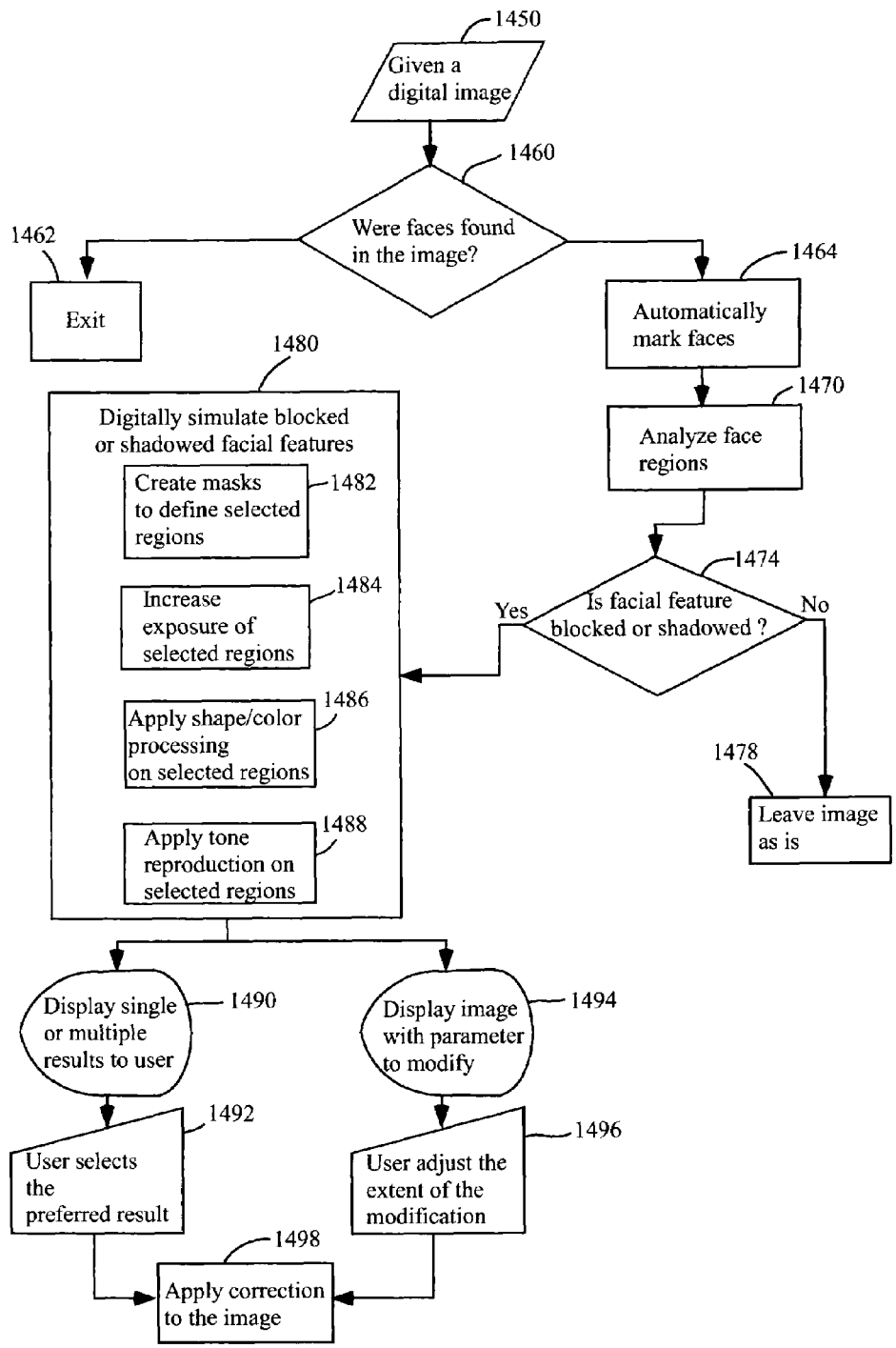
FIG. 8a illustrates an occlusion or shadowing detection and correction method in accordance with one or more preferred embodiments.

Alternatively, as described by the flow chart of FIG. 8a, a similar method may be utilized in the pre-acquisition stage, to determine if digital simulation or re-compositioning of an image with non-occluded or shadowed may be advantageous or not, e.g., when a facial feature is determined to be blocked or shadowed. In block 1108 of FIG. 5, the camera searched for the existence of mouths, eyes or faces or other features in the image. At 1460, it is determined whether one or more such features were found in the image. If not, then exit at 1462. If so, then the features are marked at 1464. The feature regions are analyzed at 1470. If the features are determined to be sufficiently configured as non-occluded and/or non-shadowed at 1474, then the image is left as is at 1478. However, if the features are determined to be unsatisfactorily blocked or shadowed, or the features are partially blocked or partially shadowed beyond a threshold amount, then the process can proceed to correction at 1480, 1490 and/or 1494. At 1480, a sub-routine for digitally simulating non-occluded or non-shadowed features is provided. A mask or masks define selected regions, i.e., in this example, eye or face regions. The exposure may be increased at 1484 or that may be skipped. Shape and/or color processing is performed at 1486 to the selected regions. For example, where occluding or shadowing exists in the original image, non-occluded or non-shadowed features are provided to be substituted over the occluded or shadowed features. Tone reproduction is provided at 1488.

At 1490, single or multiple results may be provided to a user. The user may select a preferred result at 1492, and the correction is applied at 1498. Alternatively, the image may be displayed at 1494 to the user with a parameter to be modified such as an occluded or shadowed facial feature. The user then adjusts the extent of the modification at 1496, and the image is corrected at 1498.

Figure 8B:
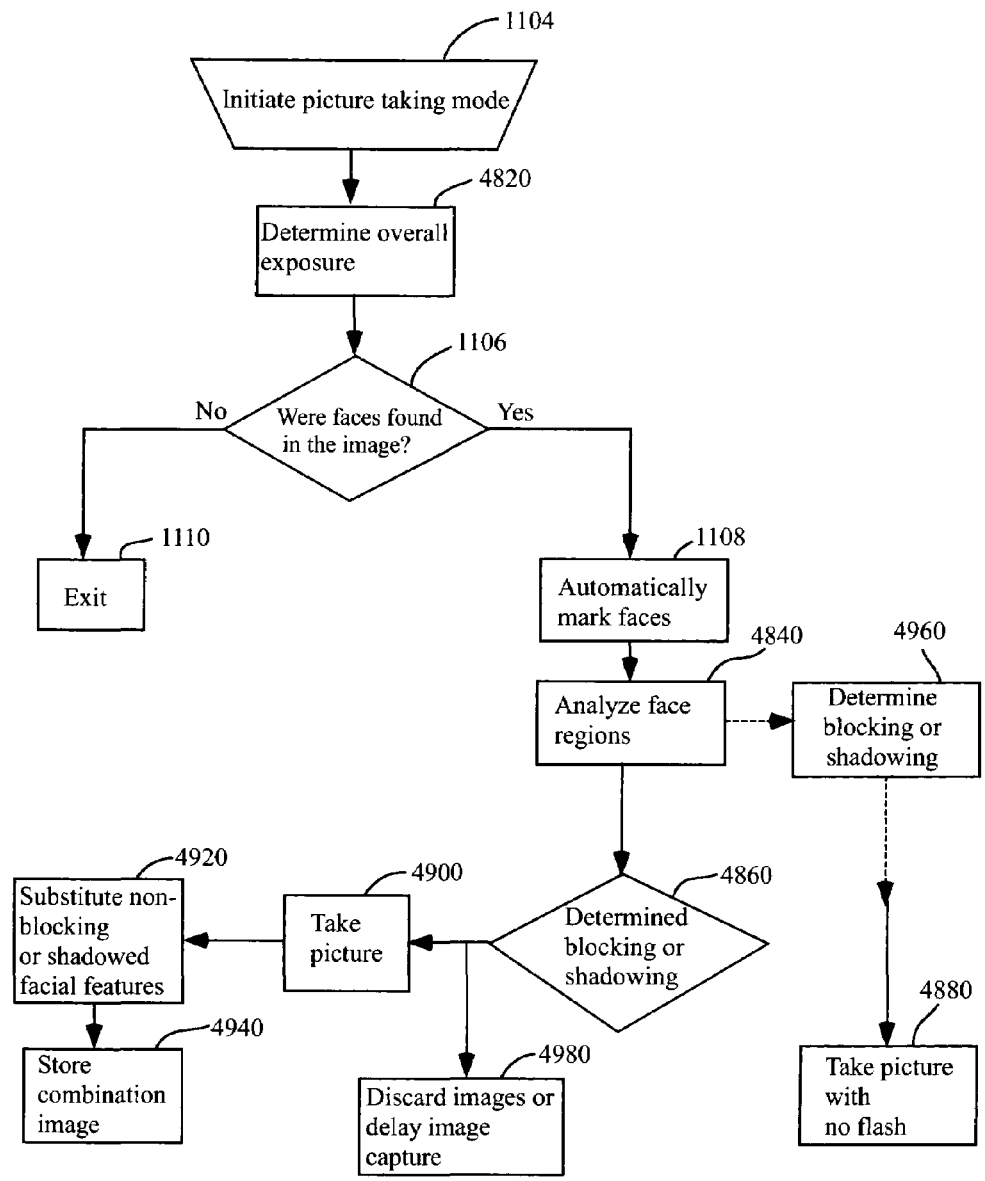
FIG. 8b describes an illustrative system in accordance with a preferred embodiment to determine whether a key facial feature is blocked or shadowed in the camera as part of the acquisition process, and whether to capture, discard or store the image, or whether to substitute a non-occluded or non-shadowed feature for an occluded or shadowed region.

FIG. 8b provides another workflow wherein picture taking mode is initiated at 1104 as in FIG. 5. The image is analyzed at 4820. A determination of whether key features were found in the image is made at 1106. If not, then exit at 1110. If so, then the features are marked at 1108. The key feature regions are analyzed at 4840, and if the features are not occluded or shadowed 4960, then the picture is either taken, stored (e.g., if the picture was previously taken) or taken and stored at 4880. If one or more of the features are determined to be occluded or shadowed at 4860, then the image may be discarded or image capture delayed at 4980, or alternatively the picture may be taken at 4900. In this latter embodiment, a non-occluded or non-shadowed mouth region is substituted for pixels of the occluded or shadowed feature at 4920, and the combination picture is stored at 4940.

Figure 9:
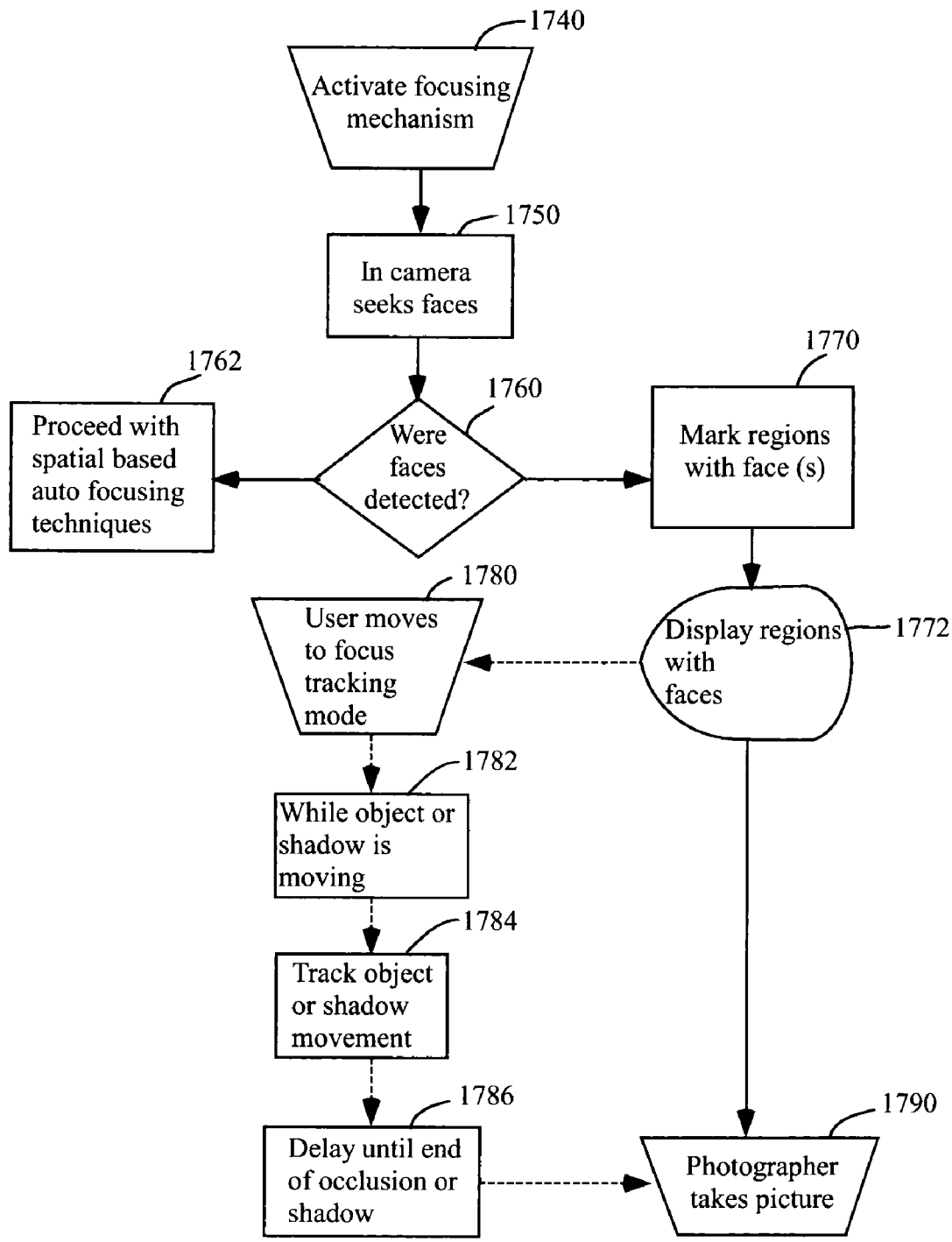
FIG. 9 illustrate an automatic focusing capability in the camera as part of the acquisition process based on the detection of a key feature in accordance with one or more preferred embodiments.

FIG. 9 illustrates a technique involving motion of occluding or shadowing objects or shadows. A focusing mechanism is activated at 1170. The camera seeks the object or shadow, and/or a key feature, at 1750. If an object or shadow, or key feature, is not detected at 1760, then spatial based auto focusing techniques are proceeded with at 1762. If an occluding or shadowing object or shadow or key feature is/are detected, then regions are marked at 1770. The regions are displayed at 1772. The user may take the picture now at 1790. However, the user may move to focus tracking mode at 1780. While the object, feature or shadow is moving, e.g., in the process of occluding or shadowing or ending an occlusion or shadowing event 1782, the object, feature or shadow movement is tracked at 1784. A delay or scene disqualification is imposed while the object, feature or shadow is moving during the occlusion process at 1786. When the disqualifying period ends, the user may take the picture, or the camera may be programmed to automatically take the shot at 1790.

What follows is a cite list of references which are, in addition to that which is described as background, the invention summary, the abstract, the brief description of the drawings and the drawings, and other references cited above, hereby incorporated by reference into the detailed description of the preferred embodiments as disclosing alternative embodiments:

United States patents no. U.S. Pat. Nos. 6,965,684 and 6,301,440, RE33682, RE31370, 4,047,187, 4,317,991, 4,367,027, 4,638,364, 5,291,234, 5,488,429, 5,638,136, 5,710,833, 5,724,456, 5,781,650, 5,812,193, 5,818,975, 5,835,616, 5,870,138, 5,978,519, 5,991,456, 6,097,470, 6,101,271, 6,128,397, 6,148,092, 6,151,073, 6,188,777, 6,192,149, 6,249,315, 6,263,113, 6,268,939, 6,282,317, 6,301,370, 6,332,033, 6,393,148, 6,404,900, 6,407,777, 6,421,468, 6,438,264, 6,456,732, 6,459,436, 6,473,199, 6,501,857, 6,504,942, 6,504,951, 6,516,154, 6,526,161, 6,151,073, 5,862,218, 6,956,966, 6,904,168, 6,873,743, and 6,751,348;

United States published patent applications no. 2003/0071908, 2003/0052991, 2003/0025812, 2002/0172419, 2002/0114535, 2002/0105662, and 2001/0031142;

U.S. provisional application No. 60/776,338, entitled Human Eye Detector;

Japanese patent application no. JP5260360A2;

British patent application no. GB0031423.7;

Yang et al., IEEE Transactions on Pattern Analysis and Machine Intelligence, Vol. 24, no. 1, pp 34-58 (January 2002); and Baluja & Rowley, "Neural Network-Based Face Detection," IEEE Transactions on Pattern Analysis and Machine Intelligence, Vol. 20, No. 1, pages 23-28, January 1998.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

In addition, in methods that may be performed according to the claims below and/or preferred embodiments herein, the operations have been described in selected typographical sequences. However, the sequences have been selected and so ordered for typographical convenience and are not intended to imply any particular order for performing the operations, unless a particular ordering is expressly provided or understood by those skilled in the art as being necessary.

What is claimed is:

1. A method of disqualifying a stored image as unsatisfactory for further image processing, comprising:
    (a) acquiring and storing a present image of a scene including a key feature region;
    (b) extracting information from the stored image during post-acquisition digital image processing;
    (c) identifying one or more groups of pixels corresponding to the key feature region;
    (d) determining whether one or more details regarding said key feature region are unsatisfactory; and if so, then
    (e) rejecting the present image for further post-acquisition digital image processing;
    (f) wherein the identifying comprises identifying one or more groups of pixels corresponding to the key feature; and the determining comprises determining whether the key feature is significantly blocked, occluded or shadowed; and if so, then the rejecting comprises disqualifying the image as a candidate for further processing, as well as any other temporally proximately captured images that are similarly blocked, occluded or shadowed,
    (g) wherein the present image comprises a full resolution capture image, and the method further comprises assembling a combination image including pixels from the present image and non-blocked, non-occluded or non-shadowed pixels corresponding to the key feature from a different image; and
    wherein a processor is used to perform the method.

2. The method of claim 1, further comprising:
    (f) acquiring one or more preview images; and
    (g) determining presence and location of one or more faces in said one or more preview images; and
    (h) wherein the identifying of the one or more groups of pixels in the present image is based at least in part on said determining of said presence and location of faces in said preview images.

3. The method of claim 1, wherein the determining whether the key feature is blocked or shadowed comprises determining a degree to which the key feature is blocked or shadowed.

4. The method of claim 1, wherein the present image comprises a full resolution capture image and the key feature comprises a face region or portion of a face region.

5. The method of claim 1, wherein the identifying of the key feature region comprises identifying a face region, and analyzing the face region to determine an eye or mouth region therein.

6. The method of claim 1, further comprising processing a different image due to the disqualifying to replace the present image.

7. A method of disqualifying an acquired image as unsatisfactory for permanent storage based on a blocked or occluded feature, comprising:
    (a) acquiring a present image of a scene including a key feature;
    (b) identifying one or more groups of pixels corresponding to the key feature;
    (c) determining whether the key feature is shadowed or occluded or both in the present image; and if so, then
    (d) rejecting the present image as a candidate for post-acquisition digital image processing, and automatically acquiring a new image to replace the present image after delaying for a period of time,
    (e) wherein the delaying of said acquiring the new image corresponds to an estimated time for said shadowing or occluding of said key feature to change; and
    wherein a processor is used to perform the method.

8. The method of claim 7, further comprising providing a notification that said present image is unsatisfactory.

9. The method of claim 8, wherein said notification is visual, audible or a combination thereof.

10. The method of claim 7, further comprising:
   (i) acquiring one or more preview images; and
   (ii) determining presence and location of shadows or occlusions or both in said one or more preview images; and
   (iii) wherein the determining in said present image is based at least in part on said determining in said preview images.

11. The method of claim 7, wherein the identifying comprises identifying one or more groups of pixels corresponding to a face region; and the determining further comprises determining whether the face region has an unsatisfactory configuration; and if so, then the rejecting comprises disqualifying the scene as a candidate for a processed, permanent image while the face region has the unsatisfactory configuration.

12. The method of claim 11, wherein the unsatisfactory configuration comprises blinking or frowning or both.

13. The method of claim 7, wherein the determining whether the key feature is shadowed or occluded comprises determining a degree to which the key feature is shadowed or occluded.

14. A method of disqualifying an acquired image as unsatisfactory for permanent storage based on a blocked or occluded feature, comprising:
   (a) acquiring a present image of a scene including a key feature;
   (b) identifying one or more groups of pixels corresponding to the key feature;
   (c) determining whether the key feature is shadowed or occluded or both in the present image; and if so, then
   (d) rejecting the present image as a candidate for post-acquisition digital image processing, and automatically acquiring a new image to replace the present image after delaying for a period of time,
   (e) wherein the delaying comprises predicting when the occluding or shadowing will stop and ending the delaying at approximately a predicted occluding or shadowing completion time; and
   wherein a processor is used to perform the method.

15. A method for automatically disqualifying an unsatisfactory scene as an image acquisition control of a camera, comprising:
   (a) acquiring multiple preview images;
   (b) extracting information from said multiple preview images;
   (c) analyzing one or more changes in the scene between individual images of said multiple temporary images;
   (d) based on the analyzing, determining whether one or more key features within the scene is being shadowed or occluded; and
   (e) disqualifying the scene as a candidate for a processed, permanent image while said shadowing or occluding continue to exist,
   (f) wherein the analyzing comprises estimating a period of time that the shadowing or occluding will continue to exist based on detected motion of a shadow or occluding object; and
   wherein a processor is used to perform the method.

16. The method of claim 15, fun her comprising determining a disqualifying interval during which the shadowing or occluding continues and no processed, permanent image is to be acquired, and ending the disqualifying at the end of the interval.

17. An image acquisition apparatus including an imaging optical system and digital image detector and storage medium, and having stored therein program instructions for programming one or more processors to perform a method of disqualifying an acquired image as recited at any of claims 2, 3-6, 7-13 and 15-16.

18. One or more processor readable storage devices having processor readable code embodied thereon, said processor readable code for programming one or more processors to perform a method of disqualifying a stored image as unsatisfactory for further image processing, the method comprising:
   (a) acquiring and storing a present image of a scene including a key feature region;
   (b) extracting information from the stored image during post-acquisition digital image processing;
   (c) identifying one or more groups of pixels corresponding to the key feature region;
   (d) determining whether one or more details regarding said key feature region are Unsatisfactory; and if so, then
   (e) rejecting the present image for further post-acquisition digital image processing,
   (f) wherein the identifying comprises identifying one or more groups of pixels corresponding to the key feature; and the determining comprises determining whether the key feature is significantly blocked, occluded or shadowed; and if so, then the rejecting comprises disqualifying the image as a candidate for further processing, as well as any other temporally proximately captured images that are similarly blocked, occluded or shadowed,
   (g) wherein the present image comprises a full resolution capture image, and the method further comprises assembling a combination image including pixels from the present image and non-blocked, non-occluded or non-shadowed pixels corresponding to the key feature from a different image.

19. The one or more storage devices of claim 18, the method further comprising:
   (f) acquiring one or more preview images; and
   (g) determining presence and location of one or more faces in said one or more preview images; and
   (h) wherein the identifying of the one or more groups of pixels in the present image is based at least in part on said determining of said presence and location of faces in said preview images.

20. The one or more storage devices of claim 18, wherein the determining whether the key feature is blocked or shadowed comprises determining a degree to which the key feature is blocked or shadowed.

21. The one or more storage devices of claim 18, wherein the present image comprises a full resolution capture image and the key feature comprises a face region or portion of a face region.

22. The one or more storage devices of claim 18, wherein the identifying of the key feature region comprises identifying a face region, and analyzing the face region to determine an eye or mouth region therein.

23. The one or more storage devices of claim 18, the method further comprising processing a different image due to the disqualifying to replace the present image.

24. One or more processor readable storage devices having processor readable code embodied thereon, said processor readable code for programming one or more processors to perform a method of disqualifying an acquired image as unsatisfactory for permanent storage based on a blocked or occluded feature, the method comprising:

(a) acquiring a present image of a scene including a key feature;
(b) identifying one or more groups of pixels corresponding to the key feature;
(c) determining whether the key feature is shadowed or occluded or both in the present image; and if so, then
(d) rejecting the present image as a candidate for post-acquisition digital image processing, and automatically acquiring a new image to replace the present image after delaying for a period of time,
(e) wherein the delaying of said acquiring the new image corresponds to an estimated time for said shadowing or occluding of said key feature to substantially end.

25. The one or more storage devices of claim 24, the method further comprising providing a notification that said present image is unsatisfactory.

26. The one or more storage devices of claim 25, wherein said notification is visual, audible or a combination thereof.

27. The one or more storage devices of claim 24, the method further comprising:
(i) acquiring one or more preview images; and
(ii) determining presence and location of shadows or occlusions or both in said one or more preview images; and
(iii) wherein the determining in said present image is based at least in part on said determining in said preview images.

28. The one or more storage devices of claim 24, wherein the identifying further comprises identifying one or more groups of pixels corresponding to a face region; and the determining further comprises determining whether the face region has an unsatisfactory configuration; and if so, then the rejecting comprises disqualifying the scene as a candidate for a processed, permanent image while the face region has the unsatisfactory configuration.

29. The one or more storage devices of claim 28, wherein the unsatisfactory configuration comprises blinking or frowning or both.

30. The one or more storage devices of claim 24, wherein the determining whether the key feature is shadowed or occluded comprises determining a degree to which the key feature is shadowed or occluded.

31. One or more processor readable storage devices having processor readable code embodied thereon, said processor readable code for programming one or more processors to perform a method of disqualifying an acquired image as unsatisfactory for permanent storage based on a blocked or occluded feature, the method comprising:
(a) acquiring a present image of a scene including a key feature;
(b) identifying one or more groups of pixels corresponding to the key feature;
(c) determining whether the key feature is shadowed or occluded or both in the present image; and if so, then
(d) rejecting the present image as a candidate for post-acquisition digital image processing, and automatically acquiring a new image to replace the present image after delaying for a period of time,
(e) wherein the delaying comprises predicting when the occluding or shadowing will stop and ending the delaying at approximately a predicted occluding or shadowing stop time.

32. One or more processor readable storage devices having processor readable code embodied thereon, said processor readable code for programming one or more processors to perform a method of automatically disqualifying an unsatisfactory scene as an image acquisition control of a camera, comprising:
(a) acquiring multiple preview images;
(b) extracting information from said multiple preview images;
(c) analyzing one or more changes in the scene between individual images of said multiple temporary images;
(d) based on the analyzing, determining whether one or more key features within the scene is being shadowed or occluded; and
(e) disqualifying the scene as a candidate for a processed, permanent image while said shadowing or occluding continue to exist, (f) wherein the analyzing comprises estimating a period of time that the shadowing or occluding will continue to exist based on detected motion of a shadow or occluding object.

33. The one or more storage devices of claim 32, the method further comprising determining a disqualifying interval during which the shadowing or occluding continues and no processed, permanent image is to be acquired, and ending the disqualifying at the end of the interval.

* * * * *